United States Patent [19]
Olsen

[11] 3,864,614
[45] Feb. 4, 1975

[54] ELECTRO-MAGNETIC POSITION TRANSDUCER FOR A THERMO-ELECTRIC LINEAR MOTOR FORCE REBALANCE SYSTEM

[75] Inventor: Everett O. Olsen, Wrentham, Mass.

[73] Assignee: The Foxboro Company, Foxboro, Mass.

[22] Filed: Apr. 27, 1972

[21] Appl. No.: 248,286

Related U.S. Application Data
[63] Continuation of Ser. No. 63,092, Aug. 12, 1970, abandoned.

[52] U.S. Cl.............. 318/676, 336/130, 336/135, 310/4, 318/687
[51] Int. Cl. ......................................... G05b 11/01
[58] Field of Search.................. 318/676, 599, 687; 336/130, 135; 310/4

[56] References Cited
UNITED STATES PATENTS

| | | |
|---|---|---|
| 2,925,544 | 2/1960 | Lang.............................. 318/676 X |
| 3,217,308 | 11/1965 | Maxwell, Jr. .................. 336/130 X |
| 3,231,839 | 1/1966 | Koning.............................. 336/135 |
| 3,297,940 | 1/1967 | Mulligan et al................. 336/130 X |
| 3,436,629 | 4/1969 | Adler.............................. 318/599 X |

Primary Examiner—T. E. Lynch
Attorney, Agent, or Firm—Bryan, Parmelee, Johnson & Bollinger

[57] ABSTRACT

A position transducer comprising a magnetic circuit carrying a-c flux produced by an exciting winding. The magnetic circuit is interrupted with an air-gap into which extends an electrically-conductive flux-masking element of selected shapes. This element is mounted for movement in the air-gap to mask flux through the gap in proportion to the area of the part of the masking element in the gap. Changes in position of the flux-masking element change the magnitude of flux and thus alter the effective inductance of the winding. A circuit connected to the winding provides an a-c output signal responsive to the position of the flux-masking element.

13 Claims, 11 Drawing Figures

ELECTRO-MAGNETIC POSITION TRANSDUCER FOR A THERMO-ELECTRIC LINEAR MOTOR FORCE REBALANCE SYSTEM

This is a continuation of application Ser. No. 63,092, filed Aug. 12, 1970, now abandoned.

Certain aspects of the present invention have been disclosed in copending application Ser. No. 2,120, filed by E. O. Olsen on Jan. 12, 1970, and the benefit of the filing date of that application is claimed for the present application. This invention relates to a position transducer. More specifically, this invention relates to a device for producing an electrical output signal reflecting the position of an input element.

There are numerous requirements in the industry for position or motion transducers, and a wide variety of different types of such transducers have been proposed over the years. Although many of the prior transducers have been found to be useful, nevertheless the available transducers have not been fully satisfactory for certain applications, particularly those applications where at least moderately long strokes of motion are required, and where it is desired to produce an output signal which varies with position in a uniquely characterized (i.e., non-linear) manner. Moreover, the high-performance transducers of prior art design have been expensive to manufacture, and this has limited their utility. It is a principal purpose of this invention to solve certain of the problems encountered in prior art position transducers, and to provide a novel and superior design.

In one position transducer made in accordance with the invention, an a-c voltage source produces flux in a magnetic circuit interrupted with an air-gap within which is a conductive element arranged to prevent the passage of a-c flux in the portion of the gap occupied by the conductive material. This so-called "flux-masking" element (also sometimes referred to herein as a "control" element) has a predetermined physical characteristic (e.g. a selected width vs. displacement pattern) such that the amount of flux masked is a function of the position of the element. Thus the position of the element determines the inductance of the winding. Circuit means are associated with the winding to produce an output signal responsive to the winding inductance.

In one representative application, a position transducer in accordance with the invention is used to produce a signal indicating the position of the recording pen of an industrial chart recorder. The pen linkage is connected to the flux-masking element of the transducer, and the position signal produced by the transducer is used as a negative feedback signal to oppose and null the measurement (input) signal to the recorder. The pen is servo-driven to the position where the feedback signal equals the input signal.

As another application of a position transducer in accordance with the invention, the control element of the transducer may be connected to the actuator of a process valve. When the actuator moves to change the position of the process valve, the conductive material of the control element is also repositioned, thus altering the inductance of the winding. Circuit means coupled to the winding produces a signal responsive to the magnitude of inductance, thereby indicating the position of the process valve for use in a servo positioning system or the like.

The physical shape of the conductive material may be selected to obtain any desired inductance variation in response to input motions. For example, non-linear system characteristics may be "linearized" by proper shaping of the conductive material.

It is therefore, an object of the invention to provide a position transducer of simple construction, high reliability and readily controllable characteristics.

Other objects and advantages will be understood from the following description of several embodiments of the invention considered together with the drawings wherein.

Figure 1:
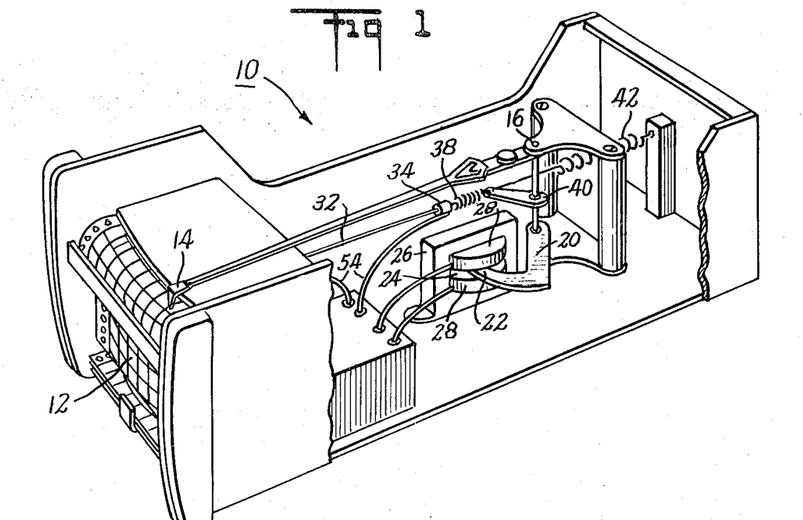
FIG. 1 is a perspective view of a chart recorder using a position transducer in accordance with the invention.
Figure 2:
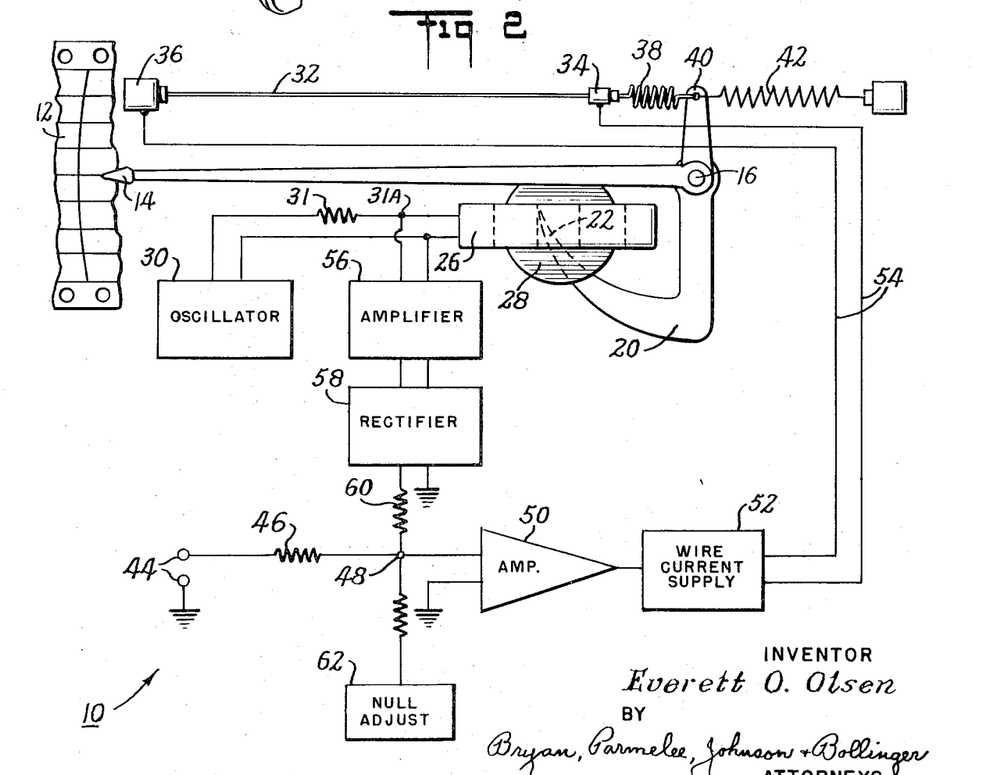
FIG. 2 is a schematic diagram showing the electrical circuit arrangements of the recorder of FIG. 1.

Referring now to FIGS. 1 and 2, there is shown a chart recorder 10 comprising a strip of marked paper 12 mounted for movement past a recording pen 14 pivotally mounted on a drive shaft 16. The mechanism used to move the paper strip is of conventional design and does not form a part of the invention.

The position of the pen 14 is sensed by a transducer in accordance with the present invention, and comprising a conductive flux-masking control element 20 which is secured to the drive shaft 16. This control element has a curvedly tapered tip 22 which extends into an air-gap 24 formed in a magnetic core structure 26. The pole pieces adjacent this air-gap are provided with respective exciting coils or windings 28 energized in flux-aiding relationship by a constant source of alternating current 30.

Changes in position of the pen 14 alter the extent to which the tip 22 is inserted into the air-gap 24, thereby (because of the tapered shape of the tip) changing correspondingly the area of the air-gap which is "masked" by the tip. Because the element is electrically-conductive, the flux attempting to pass through the inserted tip produces eddy currents which in effect cancel out the flux lines in that region. Thus the element 20 serves to mask or cut out the flux in the region it occupies, so that the total flux through the air-gap is correspondingly reduced. As the element 20 extends further into the air-gap to decrease the total flux, the inductance of the windings 28 correspondingly decreases.

The windings are energized by a circuit which includes a series resistor 31 cooperating with the windings to form a voltage divider. Thus as the winding inductance changes, the voltage at the junction 31A with the resistor changes correspondingly to provide a signal representing the position of the pen 14. This signal is used in a feedback arrangement which will be explained after briefly describing the type of pen actuator used in this particular chart recorder embodiment.

As described in more detail in the above-mentioned copending application Ser. No. 2,120, the pen 14 is positioned by an electrical actuator basically comprising a temperature-responsive wire 32 formed of a mixture of Nickel and Titanium commonly referred to as Nitinol. This material, when properly preconditioned, will contract in length as its temperature changes. For example, the material may be preconditioned so that contraction begins at about 200°F and ends at about 250°F.

The wire 32 is heated to operating temperature by electric current passing axially down the wire and supplied through insulated terminals 34, 36. The second terminal 36 is secured to the chassis of the recorder 10. The first terminal 34 is connected through an overload safety spring 38 (essentially rigid during normal operation) to a lever arm 40 fastened to the pen shaft 16. The lever arm 40 is biased in a clockwise direction by a tension spring 42 generally aligned with the wire and attached to a vertical post secured to the chassis of the recorder.

The pen recorder and its associated electrical control circuitry will now be described: Referring to the lower left-hand corner of FIG. 2, the d-c input (measurement) signal is applied to a pair of input terminals 44 and directed through a resistor 46 to a current summing junction 48. The summing junction is connected to an operational amplifier 50 which controls a motor power supply circuit 52 connected through leads 54 to the wire 32. When the input signal changes, the wire current is correspondingly altered to vary the wire length in the correct direction.

As the wire length changes, the pen shaft 16 is correspondingly rotated to move the pen towards the new position. The control element 20 moves correspondingly, so as to vary the transducer signal at junction 31A. This signal is fed to an a.c. amplifier 56 the output of which is converted to d-c by a rectifier 58. This d-c signal is directed through a resistor 60 to provide a feedback current to the summing junction 48 in a polarity to oppose and null the change in current resulting from any change in input signal at terminals 44. The pen continues to move until a position is reached where the null at the summing junction is reestablished. Thus the pen is moved to the desired position represented by the input signal. A null adjust circuit 62 provides a d-c bias signal which determines the pen position in the absence of an input signal.

Flux-masking element 20 preferably is made of copper but may be made of any other material capable of masking, interrupting or altering the amount of flux crossing the air-gap as a function of the degree to which the control element is inserted in the gap. Flux interruption by conductive materials may be efficiently carried out at exciter frequencies substantially above electrical power frequencies where eddy-currents can readily be developed. The use of magnetic materials will tend to increase the winding inductance with increases in area of the inserted elements.

Figures 3, 4:
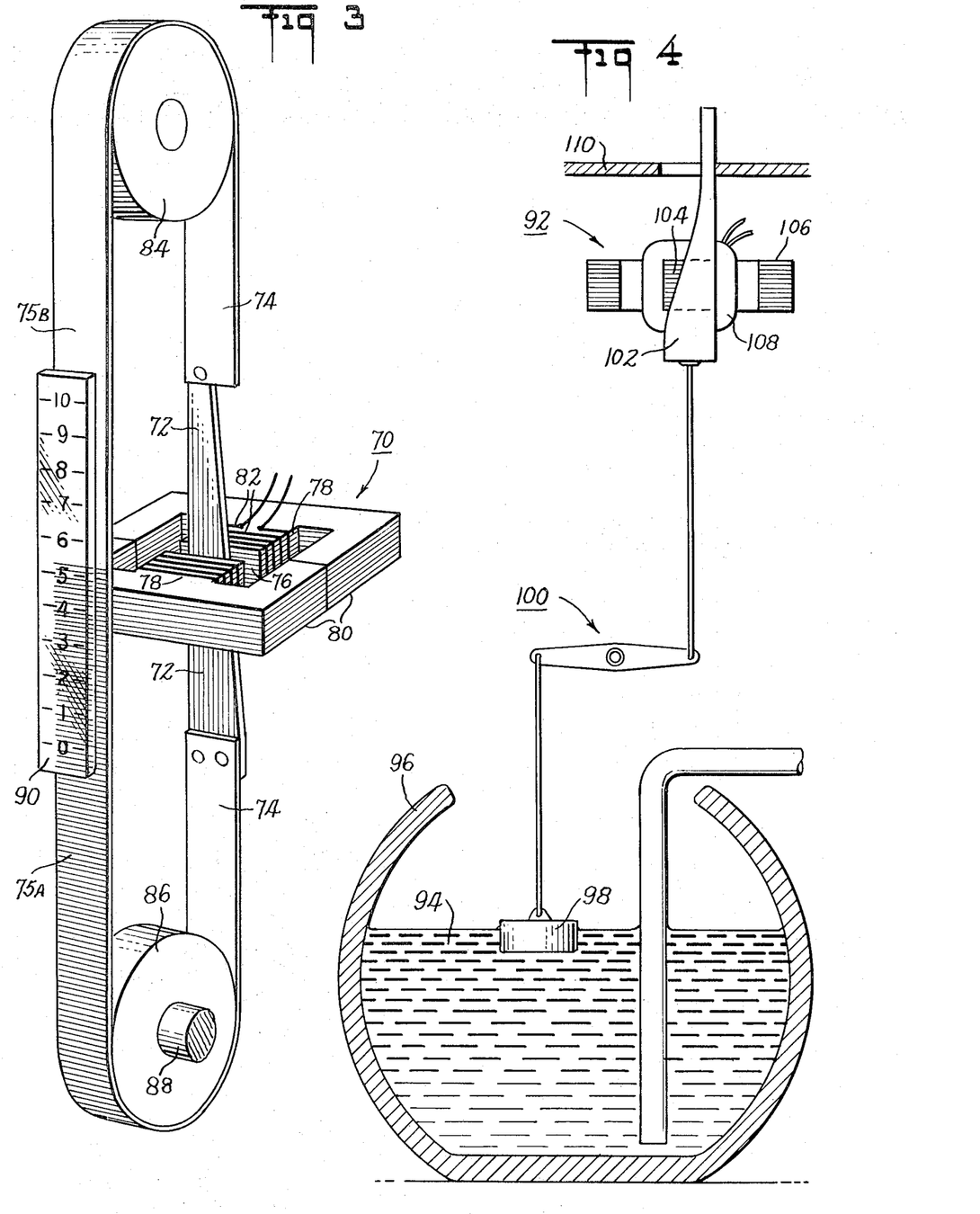
FIG. 3 is a perspective view of a ribbon indicator with a transducer in accordance with the invention.
FIG. 4 is a section view showing a system for measuring the level of a liquid in a container.

With reference now to FIG. 3, there is shown schematically a ribbon indicator having a position transducer 70 for producing a signal corresponding to the reading of the indicator. This transducer is a variable-inductance device having a linearly-tapered thin copper control element 72 secured between the ends of a conventional flexible ribbon 74 provided with visually-contrasting areas 75A, 75B. The control element extends through an air-gap 76 between center poles 78 of two E-shaped cores 80 which may be made of ferrite. Windings 82 are wound about the poles to generate a-c magnetic flux through the core. The total amount of flux through the air-gap is determined by the vertical position of element 72, due to the linearly-varying width characterization, so that the output signal of the transducer will reflect the measurement indicated by the position of the ribbon 74.

Ribbon 74 passes around two spools 84, 86 rotatably mounted on parallel axes. One spool 86 is connected to a drive member 88 rotatable by any mechanism (not shown) the position of which is to be displayed. The indicator will include conventional means such as a transparent plastic scale 90 to provide a visual display of the ribbon position.

Referring now to FIG. 4, a position transducer arrangement 92 is shown for measuring the level of liquid 94 in a tank 96. A float 98 in the liquid is connected by any suitable linkage mechanism 100 to the flux-masking element 102 of the transducer. Changes in the level of the liquid correspondingly alter the position of the control element in the air-gap 104 of a magnetic core 106 having an exciting winding 108. The control element is so shaped that as the liquid level changes, the area of the air-gap 104 blocked off by the element correspondingly changes.

The winding 108 is coupled to a read-out circuit, such as described hereinabove, to produce an output voltage which reflects the amount of air-gap area interrupted by the control element 102, thereby to indicate the liquid level. It may be noted that even though the tank has a non-rectilinear configuration (e.g. cylindrical cross-section), a linear relationship between the read-out signal and the liquid in the tank can if desired be obtained by shaping the flux-masking material in a selected non-linear configuration determined by the shape of the tank, for example, so as to produce changes in inductance bearing a linear relationship to the changes of liquid in the tank, at any vertical position of the float. A guide 110 may be provided to hold the control element in a stable position.

For some liquid-level measurements, it may be desirable to use as the transducer control element a long flexible tape of conductive material having a width which is a function of longitudinal position along the tape. Such a tape could be connected at one end to the float, and at its other end wound onto a spring-loaded take-up reel. Because the tape could be quite long, e.g., 10 feet or so, it could be used to measure directly the liquid level where the changes in level are comparably great, thereby avoiding the need for linkage mechanisms usually required to reduce the total motion input to a transducer.

Figure 5:
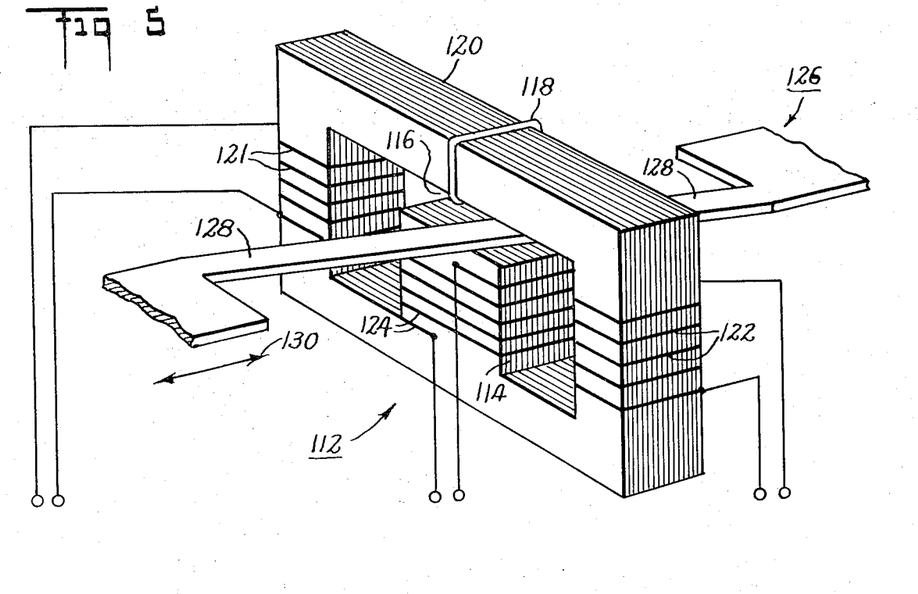
FIG. 5 is a perspective view of a position transducer adapted for use as a differential transformer.

FIG. 5 shows a position transducer adapted to be used as a differential transformer. This embodiment includes a core 112 having a single center leg 114 defining an air-gap 116. A short-circuiting single-turn coil 118 is placed around top member 120 directly opposite leg 114 and at the center of the gap. A pair of output windings 120, 122 are magnetically coupled to side legs of the magnetic core and an exciter input winding 124 is provided around center leg 114.

A flux-masking element 126 extends into the air-gap 116 and is mounted for movement therethrough in a direction perpendicular to the effective plane of the core 112. The flux-masking element comprises an elongate conductive strip 128 which is oriented at a smalll angle transversely with respect to its direction of movement.

The short-circuiting coil 118 prevents any a-c flux from passing through the top member 120 at the position of the coil. Thus the coil effectively divides the air-gap 116 into two separate side-by-side air-gaps, each coupled to one of the output windings 121, 122. Because the conductive strip 128 is oriented at an angle with respect to the short-circuiting winding, changes in the position of the flux-masking element 126 in a direction perpendicular to the plane of the magnetic core will cause corresponding changes in the relative amounts of flux coupled to the output windings 121, 122 from input winding 124. For example, if the control element is moved in the direction indicated by arrow head 130, less flux is coupled to winding 121, thus reducing the latter's output signal, while more flux is coupled to winding 122 so as to increase its output signal. By connecting the output signals of the two windings in series-opposition, there is produced a net output signal having a null zero at the center of the range, and elsewhere having an amplitude and phase representing the position of the control element. Rotational motion of this element 126 instead of lineal motion may also be employed.

Figure 6:
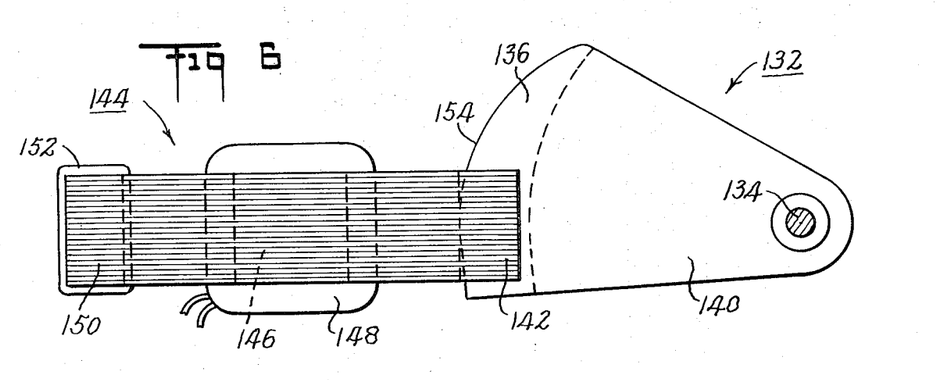
FIGS. 6 and 7 are plan and elevation views respectively of another embodiment of a position transducer.
Figure 7:
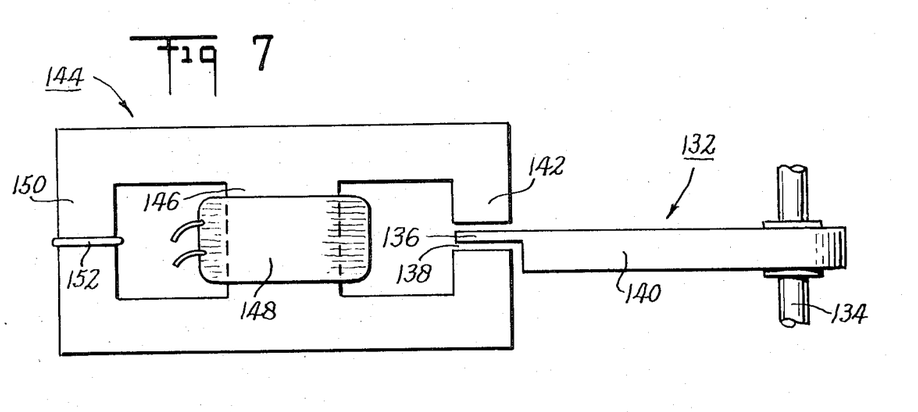

FIGS. 6 and 7 show a variable-inductance transducer wherein the flux-masking element 132 is shaped somewhat like a sector and is mounted for rotary motion on a shaft 134. This element includes a peripheral portion 136 which is quite thin and suited for insertion in an air-gap 138 to control the flux therethrough. The central part 140 of the control element is relatively thick to provide structural integrity.

The air-gap 138 is formed in one outer leg 142 of a three-legged core 144. The central leg 146 carries an exciting winding 148 the inductance of which is controlled by the positioning of the control element 132 is its air-gap. The other outer leg 150, included for mechanical stability, is provided with a short-circuiting coil 152 in the form of a single closed loop to prevent any a-c flux from passing through that leg.

The outer peripheral edge 154 of the control element 132 is shaped in a non-circular fashion (as seen in plan view), so that the area of the conductive material in the air-gap varies with the rotational position of the control element. Thus the flux through the air-gap is correspondingly varied so as to change the inductance of winding 148 with changes in rotary position. Suitable circuitry as described above is connected to the winding to develop an appropriate output signal.

Figure 8:
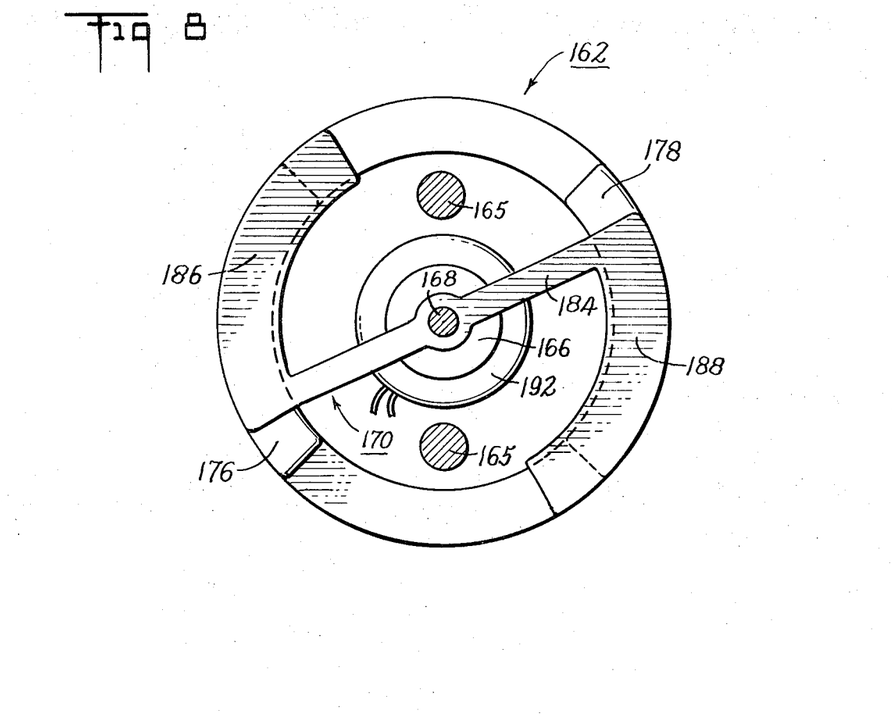
FIGS. 8 and 9 are respectively horizontal and vertical section views of still another embodiment of a position transducer.
Figure 9:
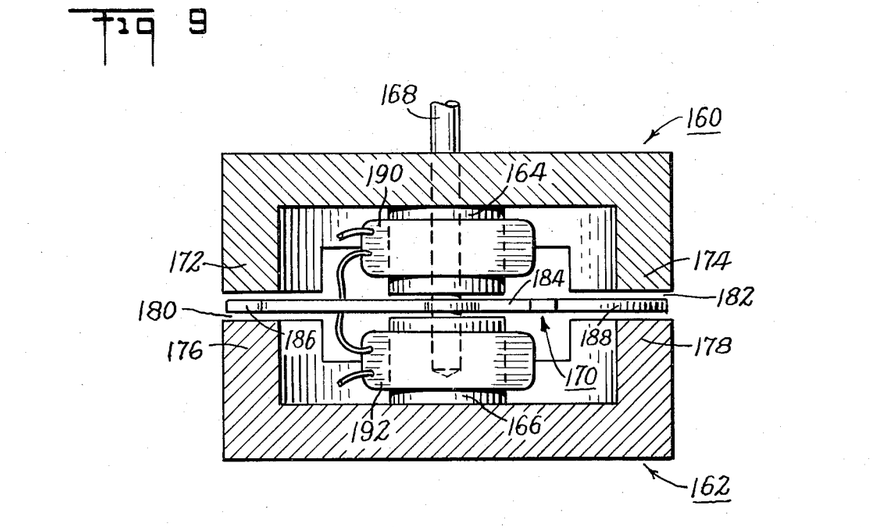

FIGS. 8 and 9 illustrate a high-sensitivity rotary position transducer. This embodiment includes a pair of cylindrical cup-shaped magnetic cores 160, 162 arranged in facing relation, a small distance apart, with supporting posts 165. Each core includes a center pole piece 164, 166 bored to support a rotary shaft 168 carrying a flux-masking control element 170.

Each of the cores 160, 162 is formed at diametrically-opposite regions of its periphery with outer pole-pieces 172, 174; 176, 178 aligned to form a pair of corresponding air-gaps 180, 182 for the control element 170. This control element includes a cross-piece 184 mounted at its midpoint to the shaft 168 and supporting at its ends respective flux-masking (conductive) segments 186, 188 aligned with the air-gaps. As the shaft rotates, the proportion of each air-gap 180, 182 blocked off by the respective segment changes correspondingly.

The change in effective air-gap area is detected by a pair of exciting coils 190, 192 mounted on the center pole pieces 164, 166 and energized with an a-c signal. For the reasons described previously, the inductance of these coils changes with the effective areas of the air-gaps 180, 182, thereby to provide a measure of the rotational position of the shaft 168. It may be noted that this arrangement provides a relatively large change in effective air-gap area for a given angular change, so that quite high sensitivities can be achieved.

Figures 10, 11:
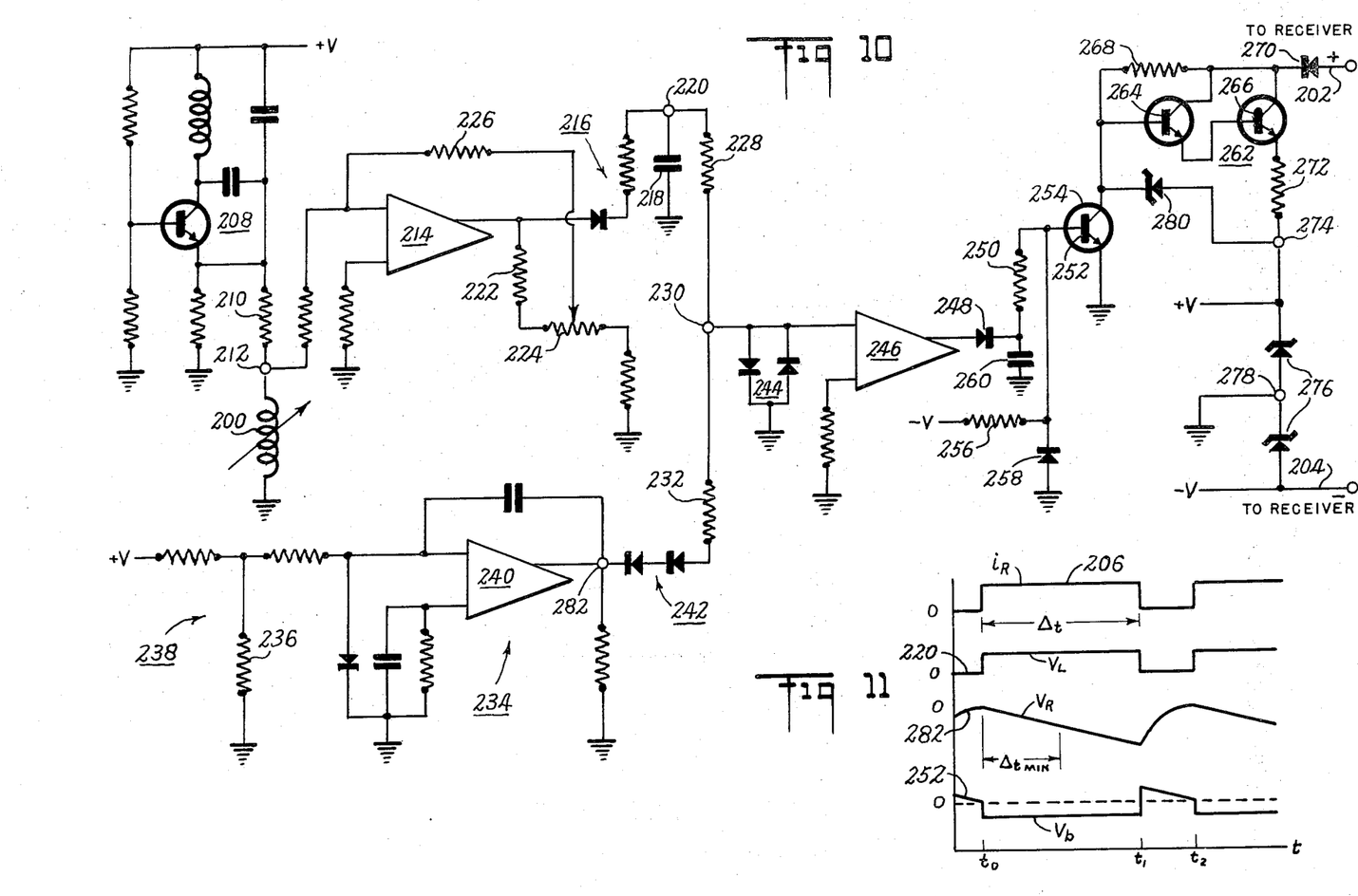
FIG. 10 is an electrical schematic block diagram of a telemetering system in accordance with the invention.
FIG. 11 is a timing diagram of selected junction voltages and current in the schematic of FIG. 10.

FIG. 10 shows the transmitter unit of a pulse-duration type telemetering system in accordance with this invention. The transmitter is controlled by a variable-inductance transducer generally indicated near the upper left-hand corner by the reference 200, and which may be a transducer device such as described hereinabove, having a movable flux-masking element. The transmitter effectively operates as a switch placed in series with a pair of transmission lines 202, 204 (at the right-hand edge of FIG. 10) which extend a substantial distance to a remote station (not shown) provided with a conventional receiver for pulse-duration signals. The transmission lines are energized at the receiver with a DC voltage of a polarity as shown, and the transmitter circuit controls the current over the lines so as to form pulses 206 (see FIG. 11) having a controllable time duration related to the inductance of the position transducer.

Turning back now to the upper left-hand corner of FIG. 10, the transmitter includes an oscillator 208 which produces an a-c signal of approximately 20KHZ for the variable-inductance transducer 200. The oscillator signal is applied through a resistor 210 which cooperates with the series inductance 200 to define a voltage-divider adapted to produce at the common junction 212 therebetween an a-c voltage the amplitude of which is determined by the magnitude of inductance. This a-c voltage is directed to an amplifier 214 having a rectifier output circuit 216 which produces a proportional positive DC voltage on a capacitor 218 (i.e., at junction 220). Negative feedback is employed around the amplifier with series-connected resistors 222, 224 and 226. Resistor 224 is variable for adjustment of the signal gain to correspondingly set the duration span of current pulses in the transmission lines 202, 204.

The Dc voltage at junction 220 produces a current through a summing resistor 228 leading to a summing junction 230. This junction also receives current through another resistor 232 in proportion to the output of a negative-slope ramp generator 234. This ramp generator is supplied with a constant input voltage developed across a resistor 236 in a voltage-divider network 238 connected between a positive voltage supply, +V, and circuit common. This constant input voltage is applied to a conventional integrator formed by an operational amplifier 240 and associated feedback elements adapted to produce a negative-going ramp output. this output is coupled through compensation diodes 242 and summing resistor 232 to summing junction 230.

Summing junction 230 is connected to a pair of parallel reverse-connected diodes 244 which limit the maximum junction voltage. The voltage developed at the junction is amplified by a high-gain amplifier 246 the output of which is coupled through a diode 248 and a resistor 250 to the base 252 of a normally non-conducting transistor switch 254. This switch is biased to cut-off by a negative voltage, −V, applied through a resistor 256 to base 252 which is limited to the negative forward conducting voltage of a diode 258 connecting the base to common. A voltage storing capacitor 260 is connected from the junction between diode 248 and resistor 250 to ground. When the summing junction 230 goes negative, diode 248 conducts. When the voltage from amplifier 246 increases sufficiently to overcome the base cut-off bias through resistor 256, transistor switch 254 conducts.

Transistor switch 254 controls an output switch 262 in series with transmission lines 202, 204. The output switch is composed of series-connected emitter-follower transistors 264, 266. Transistor 264 is normally biased into conduction by a high resistance 268 connected between the input line 202 (through diode 270) and the transistor base. The emitter of transistor 264 drives the base of transistor 266.

The collector and emitter of transistor 266 are connected in series with a current-limiting resistor 272 between line 202 and a junction 274. This junction in turn is connected through series-coupled Zener diodes 276 to line 204. A positive circuit power voltage, +V, is connected from junction 274 to provide power for oscillator 208 and to drive ramp generator 234. A negative circuit power voltage, −V, is taken from line 204 to bias base 252 of transistor switch 254. Junction 278 between Zener diodes 276 is coupled to circuit common.

Initially, at a time $t_o$ (FIG. 11), output switch 262 is closed since the normally forward-biased emitter-follower 264 (limited in forward bias by Zener diode 280) drives transistor 266 into conduction while transistor switch 254 is biased into cut-off (wave form $v_b$ in FIG. 11). Conduction through switch 262 produces positive voltage, +V, at junction 274, thus activating oscillator 208 and starting the negative-going ramp voltage at junction 282 (wave form $V_R$). Actuation of the oscillator produces a DC voltage $V_L$ on junction 220 proportional to the inductance of variable inductor 200.

As ramp voltage $V_R$ increases negatively at a linear rate, it eventually causes summing junction 230 to go negative at a time $t_1$ which depends upon the magnitude of the voltage of junction 220. When the summing junction goes negative, the amplified output turns on transistor switch 254 which pulls the base of transistor 264 close to circuit common potential and effectively opens switch 262.

Opening of switch 262 stops conduction of current between transmission lines 202, 204, shown by curve $i_R$ in FIG. 11, and also removes the positive voltage, +V. Removal of power voltage, +V, eliminates the drive to oscillator 208 and the ramp generator 234. Hence, junction voltages $V_L$ and $V_R$ discharge to common potential.

Although the zero volt conditions of junctions 220 and 282 permit the reopening of switch 254, the latter is held closed for a short time period determined by the rate of discharge of capacitor 260 through resistor 250 and the base to emitter junction of transistor 254. At a time $t_2$, the voltage $V_b$ of this base has sufficiently decayed to a level where the switch is effectively opened. Reopening of this switch allows switch 262 to close again to develop positive supply voltage +V at junction 274. The generation of a current pulse is then repeated.

The magnitude of the DC voltage $V_l$ developed on junction 220 determines the time duration of the output line current pulses. As noted previously, this DC voltage is determined by the magnitude of inductance of the winding 200, which is in turn determined by the position of the particular element being monitored by the telemetering system. The current pulses are detected at the other end of transmission lines 202, 204 by conventional means arranged to convert the time-duration pulses to corresponding signals (or indications) representing the magnitude of the position of the element being monitored.

Although various embodiments of the present invention have been described hereinabove in detail, it is desired to emphasize that this is for the purpose of illustrating the invention, and is not to be considered as necessarily limiting thereof, it being recognized that those skilled in this art will be able to modify the described embodiments in many ways to suit specific applications.

I claim:

1. A positioning transducer comprising magnetic material defining a closed-loop magnetic circuit interrupted at one part of said loop with an air-gap;
   an inductive winding magnetically coupled to said closed-loop magnetic circuit to present an inductive impedance responsive to the reluctance of said magnetic circuit;
   means producing an a-c current in said winding to develop flux around said magnetic circuit, said flux crossing said air-gap;
   a flux-masking element within said air-gap and adapted to be moved in the air-gap by a device the position of which is to be monitored;
   said element being characterized by non-magnetic, conductive means occupying a portion of said air-gap and arranged to intercept and alter the net flux crossing said air-gap portion by the development of eddy currents responsive to said flux, so as to alter the net flux around said closed-loop magnetic circuit, said element means being constructed and arranged such that the magnitude of the occupied air-gap portion varies with changes in position of said element and alters the amount of eddy current generated and thereby alters the total amount of said flux crossing said air-gap as said element moves with said device, whereby to change the effective inductance of said winding; and
   circuit means to produce a signal responsive to the inductance of said winding as determined by the position of said flux-masking element.

2. A position transducer comprising magnetic material defining a pair of closed-loop magnetic circuits having a common portion which includes an air-gap;
   winding means coupled to said magnetic material;
   means for energizing said winding means to produce a-c flux through both of said closed loop magnetic circuits and across said air-gap;
   electrically-conductive means to separate said air-gap into a pair of side-by-side magnetically-isolated sections each in series with a respective one of said closed-loop magnetic circuits;

a conductive non-magnetic flux-masking element movably positioned in said air-gap to absorb a part of the flux in each of said air-gap sections, by the generation of eddy currents in said element, said element being so shaped that a change in its position alters the relative magnitudes of flux in said two air-gap sections by differentially altering the amounts of eddy currents produced by the fluxes in said magnetic circuits;

and circuit means responsive to the flux in at least one of said pair of magnetic circuits to produce a signal reflecting the position of said flux-masking element.

3. A position transducer as claimed in claim 2, wherein said separating means comprises short-circuited winding means around part of said magnetic means at said air-gap.

4. A position transducer as claimed in claim 3, wherein said element is a conductive strip of material extending at a slight angle with respect to the effective plane of said short-circuited winding means.

5. A rotary position transducer comprising magnetic material defining a closed-loop magnetic circuit including an outer cylindrical core means having two portions spaced apart along the cylindrical axis to define therebetween at least one air-gap the effective plane of which extends transversely with respect to said cylindrical axis so that the flux crossing said air-gap is parallel to said axis;

an inductive winding magnetically coupled to said magnetic circuit and presenting an inductance responsive to the reluctance of said closed-loop magnetic circuit including said air-gap;

a flux-masking element in said air-gap comprising a conductive segment having an area at least approximately corresponding to the area of said air-gap in said transverse plane thereof, said element including eddy current generating means to intercept and absorb flux crossing said effective plane of said air-gap in correspondence to the positioning of said element in said air-gap;

means mounting said element for rotary motion about said axis and through said air-gap, parallel to said effective plane thereof; and means for producing a signal responsive to changes in the inductance of said winding resulting from changes in the rotary position of said element.

6. A rotary position transducer as claimed in claim 5, wherein said magnetic means comprises inner core means arranged coaxially about said axis, and said outer core means being coaxially about said inner core means and magnetically contiguous therewith.

7. A rotary position transducer as claimed in claim 6, wherein said outer core means is formed to present two arc-shaped air-gaps on opposite sides of said axis, said element having a pair of separate conductive segments each positioned in a respective air-gap.

8. Apparatus for indicating the value of a process condition such as temperature or the like, comprising:

an indicating device mounted for movement throughout a predetermined range;

means for positioning said indicating device in response to the value of a selected condition;

transducing means associated with said indicating device for developing a signal representing the position of said device;

said transducing means comprising magnetic material defining a closed-loop magnetic circuit interrupted by an air-gap;

winding means coupled to said magnetic circuit and presenting an inductive impedance in correspondence to the reluctance of said magnetic circuit;

means energizing said winding means to produce a-c flux in said magnetic circuit;

a flux-masking element mounted in said air-gap for movement therein, said element including a conductive non-magnetic section arranged to intercept and absorb by generation of eddy currents a portion of the air gap flux with the magnitude of said absorbed portion corresponding to the position of said element in said air-gap, thereby to vary the total a-c flux through said air-gap in correspondence to changes in that position, said element being coupled to said indicating device so that the element position in the air-gap corresponds to the position of the indicating device within said predetermined range; and circuit means comprising an electrical impedance connected in series with said winding means;

said energizing means serving to develop a flow of a-c current in series through both said winding means and said impedance so as to develop across said impedance a signal responsive to the inductance of said winding means and representing the position of said indicating device.

9. Apparatus as claimed in claim 8, wherein said indicating device comprises the pen mechanism of a chart recorder; and amplifier means having input means for combining the signal produced by said circuit means with a measurement signal to create a null when the pen has reached a position called for by the measurement signal.

10. Apparatus as claimed in claim 8, wherein said indicating device comprises a ribbon indicator; and means connecting one part of the ribbon directly to said flux-masking element.

11. Apparatus as claimed in claim 1, wherein said winding comprises two series-connected sections located on opposite sides of said air-gap, whereby to provide a relatively large change in inductance for a given change in position of said flux-masking element; and means responsive to the total change in inductance of both said winding sections for producing an output signal.

12. A position transducer comprising magnetic material defining a pair of closed-loop magnetic circuits each including a respective air-gap;

first and second winding means inductively coupled to said magnetic circuits, respectively;

said winding means being coupled to portions of the respective magnetic circuits which are non-common, whereby the flux in one magnetic circuit is coupled only to one winding means and the flux in the other magnetic circuit is coupled only to the other winding means;

a control device movably mounted with respect to said magnetic material and responsive to an input motion;

said control device comprising conductive nonmagnetic means having first and second portions extending into said air-gaps respectively;

said conductive means being so shaped that movement of said device alters differentially the magnetic reluctances presented by said air-gaps to the respective magnetic circuits, whereby to increase the inductance of one of said winding means while decreasing the inductance of the other winding means; and circuit means for producing an output signal corresponding to the relative inductances of said first and second winding means.

13. A position transducer as claimed in claim 1, wherein said circuit means comprises an impedance element connected in series with said winding to provide a voltage-dividing circuit; and a-c means energizing said voltage-dividing circuit to produce the output signal at the junction between said winding and said impedance.

* * * * *